United States Patent [19]

Clark

[11] 3,832,420

[45] Aug. 27, 1974

[54] SILICONE ELASTOMER CONTAINING POLYMONOMETHYLSILOXANE

[75] Inventor: Harold A. Clark, Midland, Mich.

[73] Assignee: Dow Corning Corporation, Midland, Mich.

[22] Filed: Sept. 20, 1973

[21] Appl. No.: 399,227

[52] U.S. Cl.......... 260/825, 260/37 SB, 260/46.5 G
[51] Int. Cl............................................ C08g 47/04
[58] Field of Search................... 260/825, 46.5 G

[56] References Cited
UNITED STATES PATENTS
3,759,867   9/1973   Merrill et al.................... 260/37 SB Primary Examiner—Melvyn I. Marquis
Attorney, Agent, or Firm—Roger H. Borrousch

[57] ABSTRACT

Compositions having at least 10 parts by weight of polymonomethylsiloxane dispersed in 100 parts of a silicone elastomer composition are useful as heat shrinkable materials when in the vulcanized state. The polymonomethylsiloxanes are benzene soluble, further condensable, solid at room temperature, have a melting point not exceeding 125° C., and have a gel time sufficiently long to allow complete dispersion during compounding.

4 Claims, No Drawings

SILICONE ELASTOMER CONTAINING POLYMONOMETHYLSILOXANE

BACKGROUND OF THE INVENTION

1. Field of the Invention

This invention relates to a silicone elastomer composition and heat shrinkable vulcanized silicone elastomer.

2. Description of Prior Art

Heat shrinkable silicone elastomers are known to the art. These elastomers are useful for certain insulating applications such as in electrical applications where an expanded tubing can be slipped over an electrical connection and then heated whereby the tubing shrinks forming a tight seal for the connection. A variety of materials have been added to silicone elastomer to give it the heat shrinkable characteristic; however, there have been certain disadvantages with each material used. For example, Hansen in U.S. Pat. No. 3,317,456 teaches that useful heat shrinkable silicone elastomer can be made by dispersing silphenylenesiloxanes in silicone elastomer compositions. The silphenylenesiloxanes provide excellent heat shrink characteristics, however, these materials are expensive and are not readily available. Weyer in U.S. Pat. No. 3,360,496 teaches that certain phenylsiloxane containing resins are useful to provide the heat shrinkable characteristic in silicone elastomers. The phenyl in this resin as well as in the silphenylenesiloxanes decrease the electrical properties. Where electrical properties are important factors, these heat shrinkable silicone elastomers are not useful in many applications. Cook in U.S. Pat. No. 3,597,372 teaches heat shrinkable elastomers including organic elastomers as well as silicone elastomers. He also teaches many types of resins and plastics to provide the heat shrinkable characteristics. Cook teaches the heat shrink property but does not show the electrical properties.

SUMMARY OF THE INVENTION

An object of this invention is to provide a silicone elastomer which will have heat shrinkable characteristics without decreasing the electrical properties.

This invention relates to a composition comprising a silicone elastomer composition having dispersed therein a benzene soluble, further condensable polymonomethylsiloxane which cures to an elastomer which has heat shrink capabilities without decreasing the electrical properties, such as arc-track resistance.

DESCRIPTION OF THE INVENTION

This invention relates to a composition comprising a silicone elastomer composition having dispersed throughout at least 10 parts by weight per 100 parts by weight of the silicone elastomer composition of a benzene soluble, further condensable polymonomethylsiloxane having a melting point not exceeding 125° C. such that said polymonomethylsiloxane is a solid at room temperature and has a gel time sufficiently long to allow complete dispersion during compounding.

The silicone elastomer compositions for this invention can be any composition based on a polydiorganosiloxane gum, preferably a polydimethylsiloxane gum and copolymer gums of dimethylsiloxane units and methylvinylsiloxane units. These gums are endblocked by hydroxyl groups or triorganosiloxy units such as, trimethylsiloxy units, methylphenylvinylsiloxy units or dimethylvinylsiloxy units. The silicone elastomer compositions can contain fillers, such as silica fillers, plasticizers, heat stability additives, pigments, and the like. These compositions can be cured with organic peroxides, by ionizing radiation, and those gums which contain alkenylsiloxane units can be cured with silicon-bonded hydrogen containing siloxanes and platinum catalyst. These and other conventional cure mechanisms for silicone elastomers can be used. The silicone elastomer compositions are well known in the art and can be purchased commercially.

The polymonomethylsiloxanes suitable for this invention to provide the heat shrinkable characteristics are resins which are benzene soluble and are further condensable. By further condensable, it is to be understood that the polymonomethylsiloxane contains sufficient groups which will condense to higher molecular weight and finally to insoluble gel by heating. The condensable groups can be hydroxyl groups bonded to silicon atoms, and residual groups from the starting silanes such as, methoxy or ethoxy groups. These polymonomethylsiloxanes are solids at room temperature and have a melting point which does not exceed 125° C., preferably the melting point does not exceed 100° C.

The polymonomethylsiloxanes have a gel time which is sufficiently long to allow complete dispersion during compounding. The gel time should not be so short that the polymonomethylsiloxane gels before it can be properly dispersed in the silicone elastomer composition. The minimum gel time required will vary according to the particular silicone elastomer composition used and the method of compounding. If the compounding method is slow, the gel time should be longer, particularly if the mixing requires heating. The ease of dispersion may also depend on the type of silicone elastomer composition, such that a very short gel time might be suitable, for example a gel time of 3 minutes or greater at 150° C. might be adequate.. The gel time is conveniently determined by heating the resin at 150° C. until it gels and observing the time required for gellation.

The polymonomethylsiloxanes can be made by hydrolyzing a monomethyltrimethoxysilane using 1.45 to 1.87 moles of water per mole of silane, preferably 1.6 to 1.8 moles of water per mole of silane is used. The hydrolysis is preferably carried out by adding the water to a toluene solution of the silane. After the hydrolysis is complete the mixture is refluxed for further condensation, neutralized, filtered and stripped of solvent and water. Calcium carbonate is preferably used as a neutralizing agent. The water is also preferably added over a period of time such as up to one hour. The polymonomethylsiloxanes can also be prepared by methods described in the art such as the methods described by Pruvost et al. in U.S. Pat. No. 3,624,030, and U.S. Pat. No. 3,498,782, by Merrill in U.S. Pat. No. 3,450,672 and by Nugent et al. in U.S. Pat. No. 3,634,321 where these patents by Pruvost et al., Merrill and Nugent et al. are hereby incorporated by reference for showing polymonomethylsiloxanes and methods of their preparation.

The polymonomethylsiloxane is mixed with the silicone elastomer composition by known methods for compounding silicone elastomer compositions such as by milling. The polymonomethylsiloxane is preferably added last, except the curing or vulcanizing catalyst may be the last ingredient put into the mixture. The mixture can then be cured by heating. The compositions which are cured by a platinum catalyst should contain an inhibitor for the platinum catalyst such as the acetylenic compounds described in U.S. Pat. No. 3,445,420 which is hereby incorporated by reference. The amount of polymonomethylsiloxane mixed into the silicone elastomer composition is at least 10 parts by weight per 100 parts by weight of the silicone elastomer composition. The best results are obtained in the range of from 20 to 70 parts by weight polymonomethylsiloxane per 100 parts by weight of silicone elastomer composition.

The compositions can be formed into useful articles such as tubing by known methods. The methods for making heat shrinkable tubing are described by Weyer in U.S. Pat. No. 3,257,689, by Vukovich in U.S. Pat. No. 3,427,638, by Cook et al. in U.S. Pat. No. 3,086,242 and by Sherlock in U.S. Pat. No. 3,316,343 wherein the above patents by Weyer, Vukovich, Cook et al. and Sherlock are hereby incorporated by reference to show methods of making heat shrinkable tubing.

This invention also relates to a silicone elastomer having plastic memory which is obtained by vulcanizing the composition described herein. The silicone elastomer is extendable at least 50 percent beyond its original size when heated at least above the melting point of the polymonomethylsiloxane. It retains its extended state when cooled at least below the melting point of the polymonomethylsiloxane while in the extended state and returns to approximately its original state when heated at least above the melting point of said polymonomethylsiloxane. The silicone elastomers obtained from the composition described herein frequently have a "hold out" of 100 percent or more. By hold out, it is to be understood that the percentage extensibility retained after the cured silicone elastomer is cooled in the extended state. The silicone elastomers of this invention also have retentions of about 3 to 5 percent. By retention, it is to be understood that the original dimensions are not exactly obtained after the final heating step but some small percentage of extension beyond the original size remains.

The silicone elastomers of this invention have about the same electrical properties as a silicone elastomer without polymonomethylsiloxane. Thus, one does not compromise the electrical properties by adding a resin to obtain heat shrink characteristics.

The following example is presented for illustrative purposes only and should not be construed as limiting the present invention which is properly delineated in the claims.

EXAMPLE

Compositions were prepared by milling on a rubber mill 100 parts by weight of a dimethylvinylsiloxy endblocked polydiorganosiloxane gum having 99.858 mol percent dimethylsiloxane units and 0.142 mol percent methylvinylsiloxane units, 40 parts by weight of a fume silica filler, 10 parts by weight of a hydroxyl endblocked polydimethylsiloxane fluid, 42.1 parts of a silicone resin as defined below, 3.3 parts of a black pigment, 0.24 parts of 2,4-dichlorobenzoyl peroxide and 1.9 parts of dicumyl peroxide. In the table Resin A is a silicone resin as described in U.S. Pat. No. 3,360,496 containing 48 mol percent polydimethylsiloxane having 35 dimethylsiloxane units, 50 mol percent monophenylsiloxane units and 2 mol percent diphenylsiloxane units, Resin B is Z-6018 as defined in U.S. Pat. No. 3,597,372, column 9, line 12 and Resin C is a polymonomethylsiloxane of the present invention which has a melting point range of 61°–65° C., is benzene soluble and is further condensable having 3.54 weight percent methoxy groups and 1.0 weight percent hydroxyl groups as shown by its gellation when heated at 150° C. Resin C was prepared by hydrolyzing monomethyltrimethoxysilane with 1.75 moles of water per mole of silane. The hydrolysis was done by adding water to a 50 weight percent solution of the silane in toluene. After 40 minutes the hydrolysis was complete and the temperature had increased from 25° to 47° C. This mixture was then refluxed for six hours, neutralized with calcium carbonate, filtered and then stripped of solvent on a drum drier. The silicone elastomer was made into test pieces by press molding for 10 minutes at 150°C. The durometer was determined by ASTM-D-676 procedure and recorded on the Shore A scale. The tensile strength at break and elongation at break were determined by ASTM-D-412 procedure and recorded in pounds per square inch and percentage elongation respectively. The gear strength, "Die B" was determined by the ASTM-D-624 procedure and recorded in pounds per inch. The "hold out" was determined by heating a test piece to 150°C. extending it 200 percent in length and then cooling the sample to 50° C. While it was held in the extended state, the tension was released and the percent of elongation retained was recorded as the "hold out." The test piece was then heated to 150° C. and it returned to about its original dimensions, that small amount of elongation remaining after this heating was recorded as the elongation retention. The arc-track resistance was determined by ASTM-D-2303 procedure and the results are recorded in minutes to failure. For the arc-track resistance, 0.15 cc per minute of a 0.1 weight percent ammonium chloride 0.02 weight percent of an isooctylphenyl-polyethoxyethanol aqueous solution was placed on the sample surface as contamination and the voltage was 2.5 kilovolts and series resistances 10 kiloohms. The results were as shown below for each resin.

TABLE

|  | Resin A* | Resin B* | Resin C |
|---|---|---|---|
| Durometer, Shore A | 55 | 51 | 60 |
| Tensile Strength at break, p.s.i. | 975 | 820 | 820 |
| Elongation, % | 550 | 560 | 460 |
| Tear Strength, Die B, p.p.i. | 111 | 84 | 102 |
| Hold out, % | 90 | 110 | 134 |
| Retention, % | 5 | 3 | 4 |
| Arc-track, Resistance, min. | 100 | 20 | 116 |

*Presented for Comparative purposes

That which is claimed is:

1. A composition comprising a silicone elastomer composition based on a polydiorganosiloxane gum having dispersed throughout at least 10 parts by weight per 100 parts by weight of the silicone elastomer composition of a benzene soluble, further condensable polymonomethylsiloxane having a melting point not exceeding 125° C. such that said polymonomethylsiloxane is a solid at room temperature and has a gel time sufficiently long to allow complete dispersion during compounding.

2. A silicone elastomer obtained by vulcanizing the composition of claim 1 which is extendable at least 50 percent beyond its original size when heated at least above the melting point of said polymonomethylsiloxane, retains its extended state when cooled at least below the melting point of said polymonomethylsiloxane while in the extended state and returns to approximately its original state when heated at least above the melting point of said polymonomethylsiloxane.

3. The composition according to claim 1 wherein the silicone elastomer composition is based on a polydiorganosiloxane gum having units selected from the group consisting of dimethylsiloxane units and methylvinylsiloxane units and endblocking units selected from the group consisting of hydroxyl groups, dimethylvinylsiloxy units and trimethylsiloxy units.

4. The silicone elastomer obtained by vulcanizing the composition of claim 3 which is extendable at least 50 percent beyond its original size when heated at least above the melting point of said polymonomethylsiloxane, retains its extended state when cooled at least below the melting point of said polymonomethylsiloxane while in the extended state and returns to approximately its original state when heated at least above the melting point of said polymonomethylsiloxane.

* * * * *